United States Patent [19]

Taylor

[11] Patent Number: 5,143,109
[45] Date of Patent: Sep. 1, 1992

[54] METHOD FOR BREAKING EMULSIONS

[75] Inventor: Spencer E. Taylor, Camberley, England

[73] Assignee: The British Petroleum Company p.l.c., London, England

[21] Appl. No.: 570,052

[22] Filed: Aug. 20, 1990

[30] Foreign Application Priority Data

Aug. 24, 1989 [GB] United Kingdom ............... 8919244

[51] Int. Cl.⁵ .................... F17D 1/16; B01D 17/00
[52] U.S. Cl. ................................. 137/13; 252/346; 252/347; 252/348
[58] Field of Search ............... 252/346, 347, 348; 137/13

[56] References Cited

U.S. PATENT DOCUMENTS

| | | | |
|---|---|---|---|
| 2,462,810 | 2/1949 | Ferguson | 196/30 |
| 4,277,352 | 7/1981 | Allison et al. | 252/8.55 D |
| 4,517,102 | 5/1985 | Salathiel | 252/8.55 R |
| 4,582,629 | 4/1986 | Wolf | 252/348 |
| 4,589,998 | 5/1986 | Bragg et al. | 252/330 |
| 4,623,447 | 11/1986 | Clampitt et al. | 208/187 |
| 4,765,910 | 8/1988 | Wolf | 210/708 |

*Primary Examiner*—Richard D. Lovering
*Assistant Examiner*—N. Bhat
*Attorney, Agent, or Firm*—Larry W. Evans; David J. Untener; Scott A. McCollister

[57] ABSTRACT

A method for recovering the surfactant from a dispersion or emulsion of oil and water containing a temperature sensitive surfactant which method comprises the steps of heating the dispersion or emulsion to a temperature above the cloud point of the surfactant under conditions of temperature and aqueous phase salinity such that the dispersion or emulsion breaks and separates into an oil layer, an aqueous layer and a surfactant layer, and recovering the surfactant layer.

The recovered surfactant may be recycled for use in preparing further quantities of dispersion or emulsion, thus rendering the operation more economic.

13 Claims, 5 Drawing Sheets

METHOD FOR BREAKING EMULSIONS

This invention relates to a method for breaking a dispersion or emulsion of oil and water and recovering the surfactant used in the formation of the dispersion or emulsion.

Emulsions of oil and water are well known. These may be in the form of oil-in-water emulsions (O/W) or water-in-oil emulsions (W/O). In order to prepare stable emulsions, a surfactant is generally employed. This may be a temperature sensitive surfactant, i.e., one which is more water soluble at lower temperatures and more oil soluble at higher temperatures.

A particular application of O/W emulsions is in the transportation of crude oil emulsions, particularly emulsions of heavy crude oils which are too viscous in themselves to be pumped through a pipeline. The emulsions may be transported to refineries where they may be broken by the application of heat and separated into oil and aqueous phases, with the oil phase being processed and the aqueous phase discarded as effluent which, however, requires treatment prior to discharge.

Attempts have been, made in the past to recover surfactants from emulsions.

U.S. Pat. No. 4,518,038 discloses a process for extracting surfactant from produced emulsions by concentrating the surfactants into a relatively small volume emulsion middle phase (between oil and water phases) which can be re-utilised in surfactant flooding.

This process requires the use of a hydrotropic extracting agent and leaves the surfactant as the major component of a microemulsion.

To the best of our knowledge, no method has yet been devised for recovering the surfactant from broken emulsions without the use of an extracting agent. This, therefore, represents a considerable economic loss and, in addition, the surfactant if present in the aqueous phase can give rise to effluent treatment problems and the surfactant if present in the oil may have undesirable repercussions on subsequent refining processes.

When an emulsion containing a temperature sensitive surfactant is broken at elevated temperature one might expect that the surfactant would tend to pass predominantly from the aqueous phase into the oil phase with perhaps the formation of an intermediate layer containing oil, water and a relatively high concentration of surfactant.

We have surprisingly discovered that under certain conditions this does not happen, and the surfactant, instead, separates out as a distinct, dense layer below the aqueous layer, which can readily be recovered and re-used.

The reasons for this effect are not yet fully understood but it is believed that important parameters affecting it include the temperature at which the emulsion is broken, the viscosity of the oil phase at this temperature, the salinity of the aqueous phase, and the relative densities of the oil, water and surfactant phases.

Thus according to the present invention there is provided a method for recovering the surfactant from a dispersion or emulsion of oil and water containing a temperature sensitive surfactant which method comprises the steps of heating the dispersion or emulsion to a temperature above the cloud point of the surfactant under conditions of temperature and aqueous phase salinity such that the dispersion or emulsion breaks and separates into an oil layer, an aqueous layer and a surfactant layer, and recovering the surfactant.

The recovered surfactant may be recycled for use in preparing further quantities of disperson or emulsion, thus rendering the process more economic.

The temperature, the salinity, and also the oil droplet size are interrelated and certain guidelines have been established. Within these guidelines, operating conditions for any given dispersion or emulsion can be determined by simple experiments.

In general, the ease with which a dispersion or emulsion can be resolved into three components depends on the oil droplet size, the salinity of the aqueous phase and the temperature.

The presence of a salt, e.g., sodium chloride, even in small quantities, encourages the separation of the surfactant layer and therefore this is preferably added, if not initially present.

In practice, if dispersions or emulsions are made in the field from crude oil and co-produced connate water, it will frequently be unnecessary to add salt since the connate water itself will often contain sufficient quantity.

The age of the dispersion or emulsion is perhaps also significant. The younger it is, the easier it is likely to be to resolve it.

Suitable temperatures will generally be found in the range 100°–140° C. and suitable salinities in the range 0.1 to 1% by weight of the aqueous phase.

Although dispersions may be treated in the above manner, the method is particularly applicable to the treatment of emulsions, especially emulsions of the oil-in water type.

The oil is preferably a hydrocarbon oil, although non-hydrocarbon oils may be used. Particularly suitable oils include crude oils, especially the viscous, heavy and/or asphaltenic crude oils to be found in Canada, the USA and Venezuela; for example, Lake Marguerite and Wolf Lake crude oils from Alberta, Hewitt crude oil from Oklahoma and Cerro Negro bitumen from the Orinoco Oil Belt.

Preferably the API gravity of the crude oil is in the range 5° to 20°, although the method can be applied to emulsions of crude oils outside this API range.

The invention is particularly applicable to the recovery of surfactants from HIPR (High Internal Phase Ratio) emulsions of viscous crude oils in water, including diluted HIPR emulsions. The preparation of such emulsions and their subsequent dilution is disclosed in European patent application 0156486-A2.

The method comprises directly mixing 70 to 98% by volume of a viscous oil having a viscosity in the range 200 to 250,000 mPa.s at the mixing temperature with 30 to 2% by volume of an aqueous solution of an emulsifying surfactant, percentages being expressed by volume of the total mixture, mixing being effected under low shear conditions in the range 10 to 1,000 reciprocal seconds in such manner that an emulsion is formed comprising distorted oil droplets having mean droplet diameters in the range 2 to 50 micron separated by interfacial films.

The HIPR emulsions as prepared are stable and can be diluted with aqueous surfactant solution, fresh water or saline water to produce emulsions of lower oil phase volume showing high degrees of monodispersity. The emulsions may be diluted to a required viscosity without adversely affecting stability. Because the narrow size distribution and droplet size are maintained upon dilution the resulting emulsion shows little tendency to creaming. It is also important that the viscous oil and water have similar densities. These factors reduce the risk of phase separation occurring.

The emulsions, particularly when diluted, are suitable for transportation through a pipeline.

Suitable temperature sensitive surfactants can be represented by the formula:

wherein R is a branched or unbranched alkyl group containing 4 to 20 carbon atoms or an alkyl phenyl group of formula:

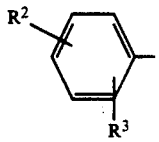

wherein $R^2$ is a branched or unbranched alkyl group containing 1 to 20 carbon atoms and $R^3$ is a hydrogen atom, or $R^2$ and $R^3$ are both branched or unbranched alkyl groups containing 1 to 20 carbon atoms,
EO is an ethylene oxide group,
PO is a propylene oxide group,
n is a number in the range 1 to 50, preferably 5 to 25,
m is a number in the range 0 to 20,
$R^1$ is an —OH radical, a sulphate or a sulphonate group.

The preferred surfactants are alkyl phenol ethoxylates, most preferably nonyl phenol ethoxylates, containing approximately 15 to 30 ethylene oxide groups per molecule, most preferably about 20.

The surfactants are suitably employed in amount 0.1 to 5% by weight expressed as a percentage by weight of the aqueous phase of the emulsion.

Asphaltenes, porphyrins and similar high molecular weight compounds, if present in the oil, may precipitate in association with the surfactant, and thus dispersion breaking or emulsion breaking may simultaneously effect deasphalting and demetallisation of the oil.

Such compounds can easily be removed from the surfactant, thus rendering the latter suitable for re-use.

According to another aspect of the present invention there is provided a method for the transportation of a viscous oil which method comprises the steps of (a) directly mixing 70 to 98%, preferably 80 to 90%, by volume of a viscous oil having a viscosity in the range 200 to 250,000 mPa.s, preferably 2,000 to 250,000 mPa.s, at the mixing temperature with 30 to 2%, preferably 20 to 10%, by volume of an aqueous solution of a temperature sensitive surfactant, percentages being expressed as percentages by volume of the total mixture; mixing being effected under low shear conditions in the range 10 to 1,000, preferably 50 to 250, reciprocal seconds in such manner that an HIPR emulsion is formed comprising distorted oil droplets having mean droplet diameters in the range 2 to 50 micron separated by interfacial films, (b) diluting the HIPR emulsion with an aqueous phase to a desired viscosity and concentration, e.g. to an emulsion containing 30-50% by volume of the aqueous phase, (c) transporting the diluted emulsion through a pipeline, (d) heating the diluted emulsion to a temperature above the cloud point of the surfactant under conditions of temperature and aqueous phase salinity such that the diluted emulsion breaks and separates into an oil layer, an aqueous layer and a surfactant layer, (e) recovering the surfactant layer, and (f) recycling the recovered surfactant by dissolving it in water and utilising the resulting solution in Step (a).

BRIEF DESCRIPTION OF THE DRAWINGS

The phase separation behavior of the system is illustrated in FIGS. 1A and 1B.

Figure 1A:
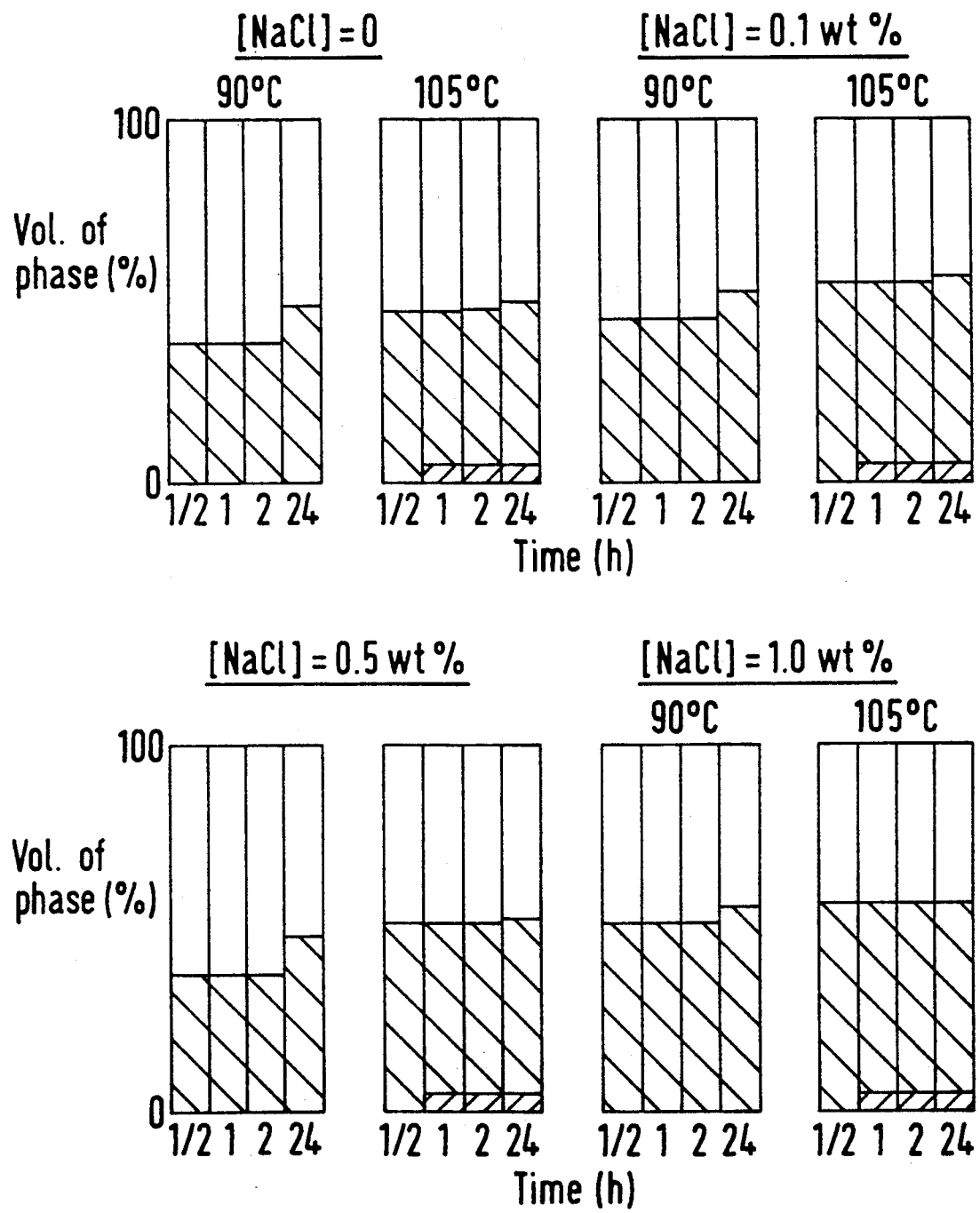
FIG. 1A represents the behavior of the system containing 2.5% NP20 and FIG. 1B the systems containing 5% NP20. The phase separation behavior of this system is also illustrated in FIGS. 2A and 2B.

The invention is illustrated by but not limited with reference to the following Examples and FIGS. 1A, 1B, 2A, 2B and 3 of the accompanying drawings.

EXAMPLES

Wolf Lake crude oil (WLCO) having an API Gravity of 10.3°, was used as the heavy oil phase in both the neat form and blended with 30% naphtha as a diluent. The surfactant, NP20, was a nonylphenol ethoxylate containing an average of 20 moles of ethylene oxide per molecule. The salt was sodium chloride.

The HIPR derived emulsions of Examples 2 and 3 stabilised with 2.5 or 5 wt % NP20 in the aqueous phase were prepared by the two stage method described in EP 0156486-A2. The coarse dispersion of Example 1 was prepared in the same equipment but in one stage using a 50/50 blend of oil and aqueous phase.

PHASE BEHAVIOUR STUDIES

Samples of the relevant heavy oil and aqueous phases were sealed in phase tubes (total volume ca 12 ml) made from 10 ml graduated glass pipettes. These tubes were then incubated at the required temperature (typically >90° C.) in an oven fitted with an observation window, and the phase behavior/emulsion resolution monitored for 24 hours. The series of systems examined in this study are given in Table 1.

TABLE 1

| Example | Phase volume (ml) | | Aqueous phase Composition (wt %) | | Comments |
|---|---|---|---|---|---|
| | Oil | Aqueous | Surfactant | Salt | |
| 1A | 5 | 5 | 2.5 | 0 | Coarse dispersion of |
| 1B | | | | 0.1 | WLCO in relevant |
| 1C | | | | 0.5 | aqueous phases |
| 1D | | | | 1.0 | |
| 1E | 5 | 5 | 5.0 | 0 | |
| 1F | | | | 0.1 | |
| 1G | | | | 0.5 | |
| 1H | | | | 1.0 | |
| 2A | 6.5 | 3.5 | 2.5 | 0 | 65 wt % HIPR- |
| 2B | | | | 0.1 | derived |
| 2C | | | | 0.5 | WLCO-in-water |
| 2D | | | | 1.0 | emulsion used |
| 2E | 6.5 | 3.5 | 5.0 | 0 | |
| 2F | | | | 0.1 | |
| 2G | | | | 0.5 | |
| 2H | | | | 1.0 | |
| 3A | 7.5 | 2.5 | 2.5 | 0 | 1:1 (v/v) mixture of |
| 3B | | | | 0.1 | 50% HIPR-derived |
| 3C | | | | 0.5 | WLCO-in-water |

TABLE 1-continued

| Ex-ample | Phase volume (ml) | | Aqueous phase Composition (wt %) | | Comments |
|---|---|---|---|---|---|
| | Oil | Aqueous | Surfactant | Salt | |
| 3D | | | | 1.0 | emulsion and WLCO/blend |
| 3E | 7.5 | 2.5 | 5.0 | 0 | |
| 3F | | | | 0.1 | |
| 3G | | | | 0.5 | |
| 3H | | | | 1.0 | |

EXAMPLE 1

Coarse dispersions were prepared of WLCO in aqueous phases containing the concentrations of surfactant and salt set out in Table 1 and the phase separation investigated at temperatures of 90° and 105° C.

At 90° C. the effect of a prolonged incubation time was merely to promote separation of the oil and water phases into an upper layer of oil and a lower aqueous layer with no surfactant separation. However, at the higher temperature, substantial differences resulting from the different salt concentrations were apparent. Although there was little effect of salt concentration on the overall phase separation process, differences in the quality of the aqueous phase were revealed at the higher temperature, with the presence of salt clearly an advantage. For this system a temperature of 105° C. was sufficient to promote surfactant phase separation into a third layer below the water layer.

Figure 1B:
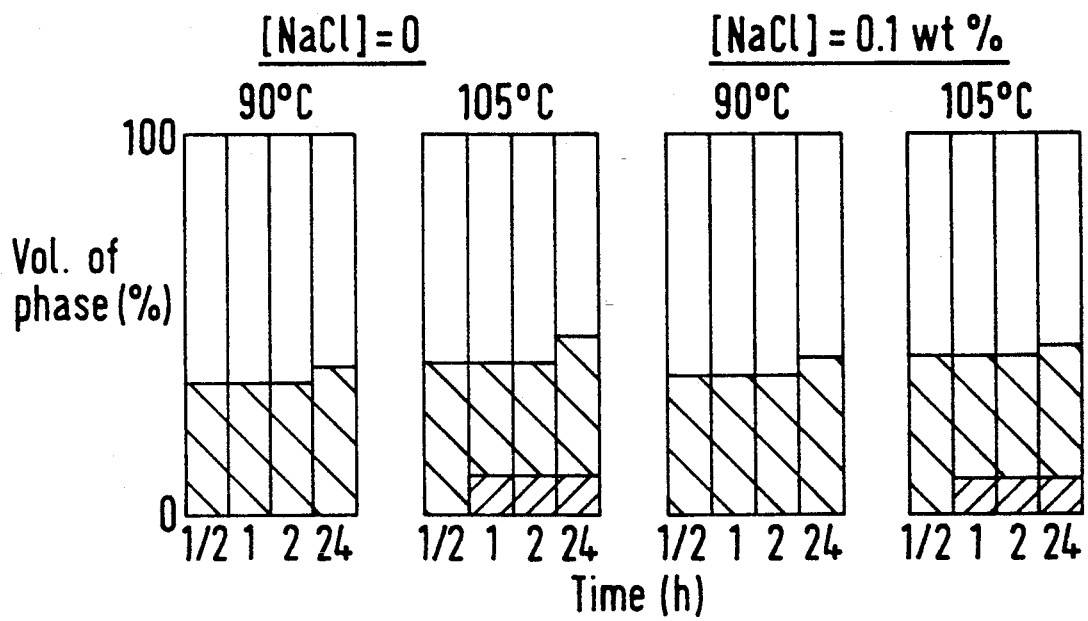
Figure 1B:
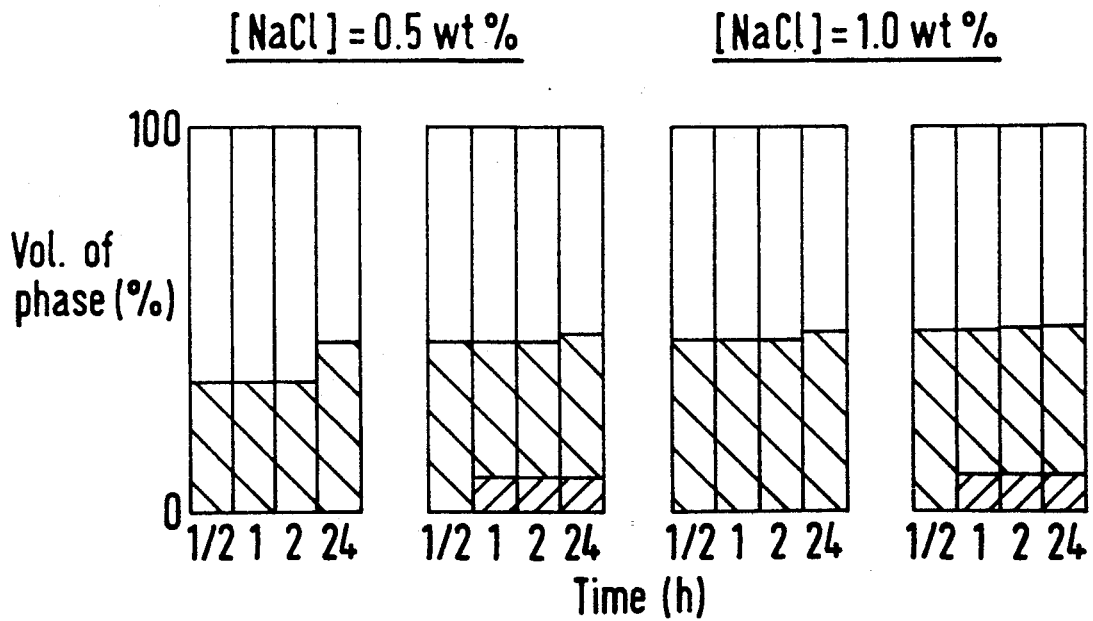

The phase separation behaviour of this system is illustrated in FIGS. 1A and 1B. The clear area represents the oil phase, the wide hatching the aqueous phase and the narrow hatching the surfactant phase. FIG. 1A represents the behaviour of the system containing 2.5% NP20 and FIG. 1B the system containing 5% NP20.

EXAMPLE 2

HIPR emulsions were prepared of WLCO in aqueous phases containing the concentrations of surfactant and salt set out in Table 1 and the phase separation investigated at temperatures of 105° and 125° C.

In contrast to the behaviour observed for the coarse dispersion, the emulsion system required the higher temperature of 125° C. to induce efficient phase separation into the three layers although emulsion resolution commenced at 105° C. In this system also, the presence of salt in the aqueous phase improved the quality of the separated aqueous phase for both surfactant concentrations.

Figure 2A:
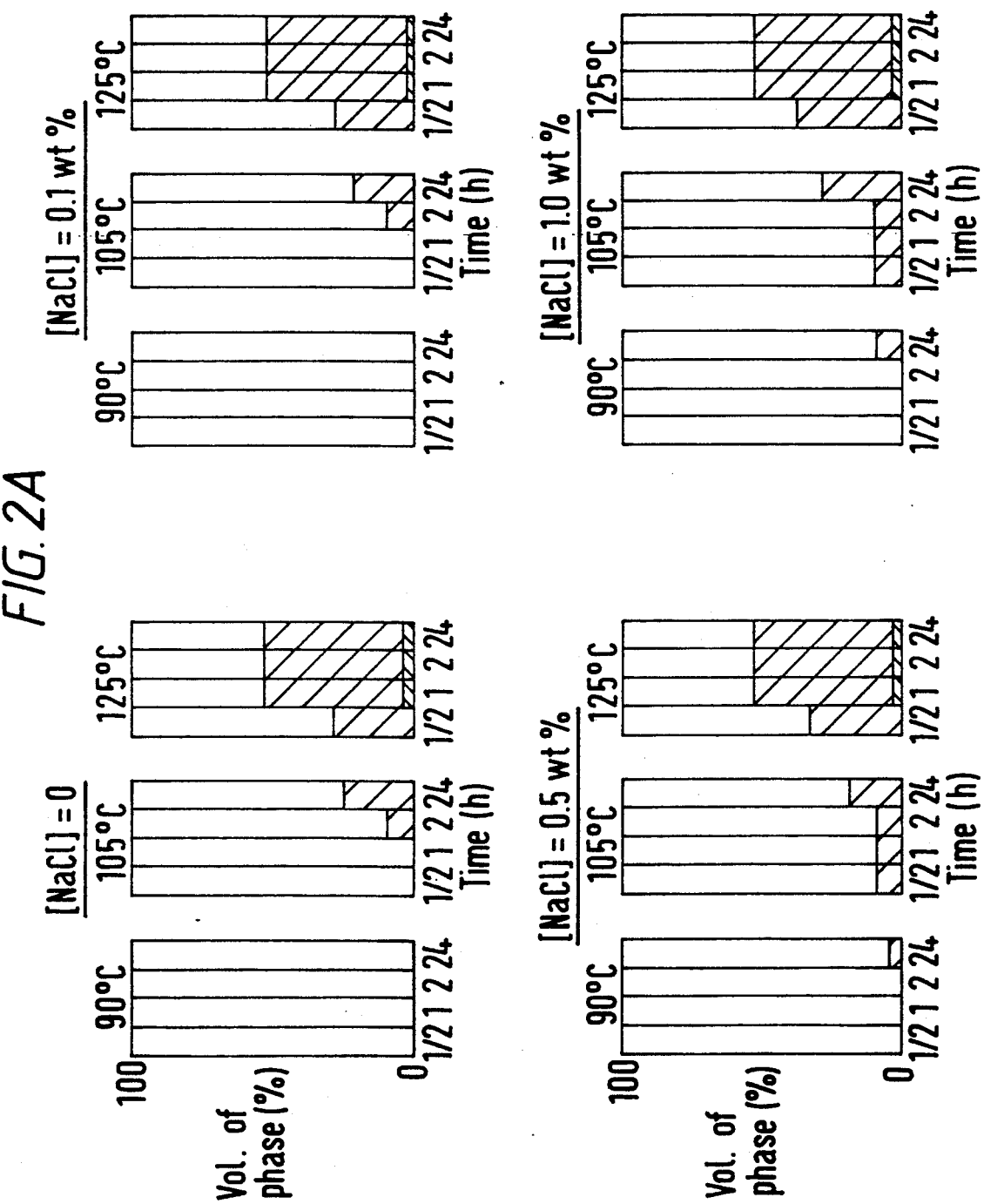
FIG. 2A represents the behavior of the system containing 2.5% NP20 and FIG. 2B the system containing 5% NP20. The phase separation behavior of this system is further illustrated in FIG. 3.
Figure 2B:
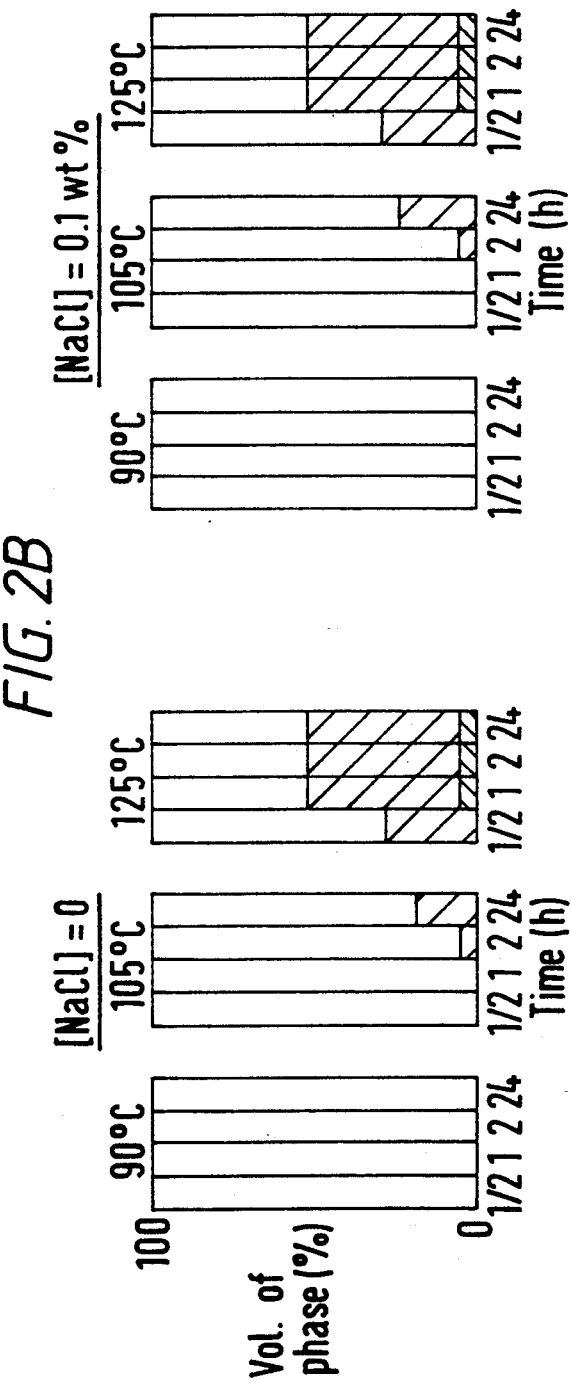

The phase separation behaviour of this system is illustrated in FIGS. 2A and 2B. In this case, the clear area represents the oil or emulsion phase, the wide hatching the aqueous phase and the narrow hatching the surfactant phase. FIG. 2A represents the behaviour of the system containing 2.5% NP 20 and FIG. 2B the system containing 5% NP 20.

EXAMPLE 3

In an attempt to simulate the co-treatment of WLCO emulsions and blended WLCO (i.e., containing a diluent), at for example, a refinery, the high temperature phase separation/resolution of a 1:1 (by volume) mixture was examined as described above for Example 2.

The behaviour was analogous to the behaviour of the emulsion itself, allowing for the reduced volume of the separated water and surfactant phases. Also consistent with the previous examples was the beneficial effect that the presence of salt had on the quality of the separated water.

Figure 2B:
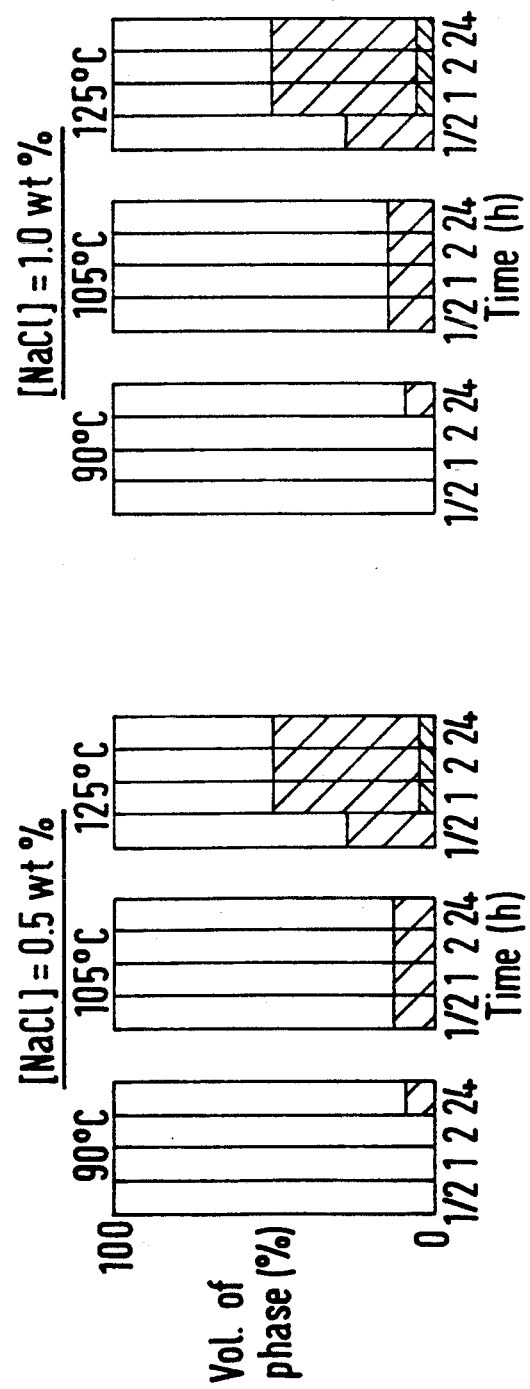
Figure 3:
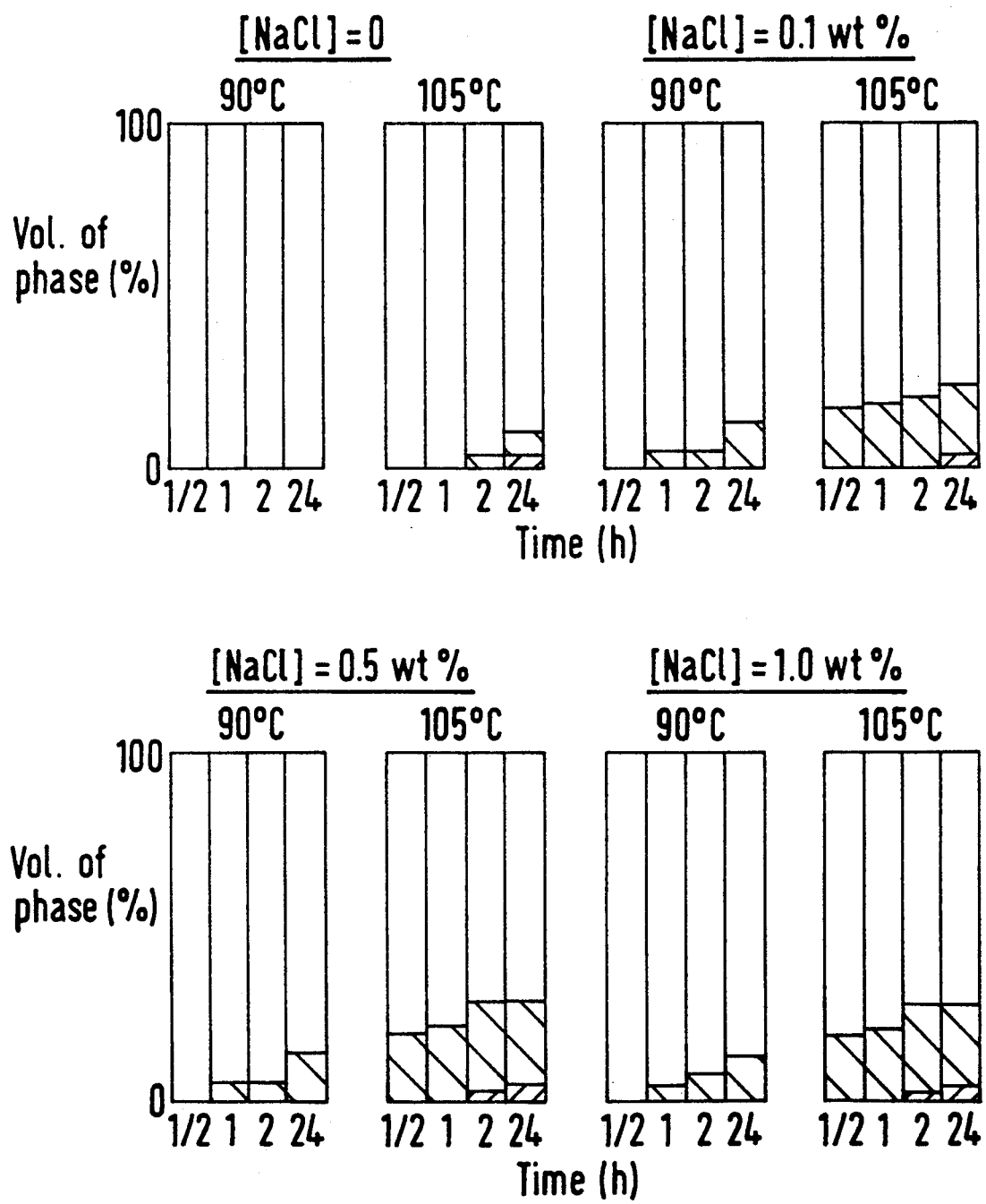
FIG. 3 represents behavior of the system containing 5% NP20.

The phase separation behaviour of this system is illustrated in FIG. 3, with the same symbolism as for FIG. 2. FIG. 3 represents the behaviour of the system containing 5% NP 20.

These results demonstrate the separation of surfactant in the presence of salt in the region of 100°-130° C. In the presence of heavy oil, the temperature at which surfactant separation occurs varies slightly, depending on whether the oil is coarsely dispersed or emulsified. Of significance is the effect of salt concentration, in which the effects of even a low concentration of salt are evident.

Heating a coarse dispersion of a heavy oil in aqueous NP20 solutions to temperatures in excess of 100° C. promotes the separation of a dense surfactant-rich phase.

When the heavy oil is present as emulsified droplets the emulsion is simultaneously broken when the surfactant phase separates.

Emulsion resolution and surfactant phase separation also occur for mixtures of blended and emulsified heavy oil.

I claim:

1. A method for recovering the surfactant from a dispersion or emulsion of oil and water containing a temperature sensitive surfactant which method comprises the steps of heating the dispersion or emulsion to a temperature above the cloud point of the surfactant under conditions of temperature and aqueous phase salinity such that the dispersion or emulsion breaks and separates into an oil layer, an aqueous layer and a surfactant layer, and recovering the surfactant layer.

2. A method according to claim 1 wherein the dispersion or emulsion is heated to a temperature in the range 100°-140° C.

3. A method according to claim 1 wherein the aqueous phase contains 0.1 to 1% by weight salt.

4. A method according to claim 1 wherein the oil is a crude petroleum oil.

5. A method according to claim 4 wherein the crude oil has an API gravity in the range 5°-20°.

6. A method according to claim 5 wherein the emulsion is an HIPR emulsion or derived from an high internal phase ratio emulsion.

7. A method according to claim 6 wherein the high internal phase ratio emulsion is prepared by directly mixing 70 to 98% by volume of a viscous oil having a viscosity in the range 200 to 250,000 mPa.s at the mixing temperature with 30 to 2% by volume of an aqueous solution of an emulsifying surfactant, percentages being expressed as percentages by volume of the total mixture, mixing being effected under low shear conditions in the range 10 to 1,000 reciprocal seconds in such manner that an emulsion is formed comprising distorted oil droplets having means droplet diameters in the range 2 to 50 micron separated by interfacial films.

8. A method according to claim 1 wherein the temperature sensitive surfactant is represented by the formula:

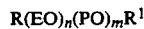

wherein R is a branched or unbranched alkyl group containing 4 to 20 carbon atoms or an alkyl phenyl group of formula:

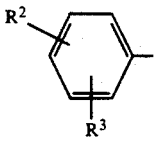

wherein $R^2$ is a branched or unbranched alkyl group containing 1 to 20 carbon atoms and $R^3$ is a hydrogen atom,
or $R^2$ and $R^3$ are both branched or unbranched alkyl groups containing 1 to 20 carbon atoms,
EO is an ethylene oxide group,
PO is a propylene oxide group,
n is a number in the range 1 to 50,
m is a number in the range 0 to 20, and
$R^1$ is an —OH radical, a sulphate or a sulphonate group.

9. A method according to claim 8 wherein the temperature sensitive surfactant is an alkyl phenol ethoxylate containing 15-30 ethylene oxide groups per molecule.

10. A method according to claim 9 wherein the temperature sensitive surfactant is a nonyl phenol ethyoxylate containing 20 ethylene oxide groups per molecule.

11. A method according to claim 1 wherein the surfactant is used in amount 0.1 to 5% by weight of the aquous phase of the emulsion.

12. A method for the transportation of a viscous oil which method comprises the steps of (a) directly mixing 70 to 98%, by volume of a viscous oil having a viscosity in the range 200 to 250,000 mPa.s, at the mixing temperature with 30 to 2%, by volume of an aqueous solution of a temperature sensitive surfactant, percentages being expressed as percentages by volume of the total mixture; mixing being effected under low shear conditions in the range 10 to 1,000 reciprocal seconds in such manner that an high internal phase ratio emulsion is formed comprising distorted oil droplets having mean droplet diameters in the range 2 to 50 micron separated by interfacial films, (b) diluting the high internal phase ratio emulsion with an aqueous phase to a desired viscosity and concentration, (c) transporting the diluted emulsion through a pipeline, (d) heating the diluted emulsion to a temperature above the cloud point of the surfactant under conditions of temperature and aqueous phase salinity such that the diluted emulsion breaks and separates into an oil layer, an aqueous layer and a surfactant layer, (e) recovering the surfactant layer, and (f) recycling the recovered surfactant by dissolving it in water and utilising the resulting solution in Step (a).

13. A method according to claim 12 wherein the high internal phase ratio emulsion is diluted to an emulsion containing 30-50% by volume of the aqueous phase.

* * * * *